United States Patent [19]

Johnson

[11] Patent Number: 4,593,914

[45] Date of Patent: Jun. 10, 1986

[54] WELLHEAD SEALING SYSTEM

[75] Inventor: Clarence W. Johnson, Calgary, Canada

[73] Assignee: Bralorne Resources Limited, Calgary, Canada

[21] Appl. No.: 531,642

[22] Filed: Sep. 13, 1983

[30] Foreign Application Priority Data

Jul. 19, 1983 [CA] Canada .................................. 432780

[51] Int. Cl.⁴ ........................... F16J 15/12; F16J 15/32
[52] U.S. Cl. ........................................ 277/5; 277/165; 277/189
[58] Field of Search ................. 277/915, 5, 165, 189, 277/63, 59

[56] References Cited

U.S. PATENT DOCUMENTS

| | | | |
|---|---|---|---|
| 2,075,899 | 4/1937 | Humason | 277/5 |
| 2,617,485 | 11/1952 | Thatch | 277/5 |
| 2,754,136 | 7/1956 | Phillips | 277/206 |
| 4,371,179 | 2/1983 | Bohman | 277/165 |
| 4,426,086 | 1/1984 | Fournie | 277/189 |

Primary Examiner—Robert I. Smith

Attorney, Agent, or Firm—John R. Uren

[57] ABSTRACT

A wellhead sealing system comprises a casing, a tubing spool and a bushing between the casing and tubing spool. A first recess is provided in the bushing and a first casing seal is mounted therein to act between the bushing and the casing. A second recess is provided in the tubing spool and a first bushing seal is mounted therein to act between the tubing spool and the bushing. The casing seal has cylindrical inside and outside surfaces located generally at the inside and outside diameters of the seal. The cylindrical inside surface is defined by a radially inwardly extending convex central protuberance and opposed cylindrical flat surface areas extending axially outwardly from the convex central protuberance into first transition areas extending to respective end surfaces. The outside surface is defined by a circumferential centrally located groove flanked by axially outwardly extending flexible retaining flanges forming second transition areas between the cylindrical outside surface and the end surfaces. Spring means extend around the inside circumference of the seal and are located adjacent each of the first transition areas.

22 Claims, 5 Drawing Figures

WELLHEAD SEALING SYSTEM

INTRODUCTION

This invention relates to wellhead seals and, more particularly, to wellhead seals used between tubing and well casing and the inside diameters of wellhead fittings.

BACKGROUND OF THE INVENTION

Casing is used when drilling wells to prevent the drill hole from caving and to preclude undesirable formation fluid movement in the surrounding rock strata. Casing is hung from a casing hanger mounted in a casing head. A "primary" seal is used in the casing hanger to seal and prevent fluid flow between the outside of the casing and the casing head.

The casing continues upwardly from the casing head and is terminated by cutting at an optimal location. The cut end of the casing is generally bevelled to remove sharp edges. Thereafter, a tubing spool is inserted over the end of the casing and attached to the casing head.

The tubing in the well acts as a conduit for the oil, gas or water of the well. It extends from the bottom of the well within the casing and upwardly a distance from the top of the cut casing. A tubing hanger is threaded on the tubing and mounted in the tubing spool. A mating bonnet is connected to the upper end of the tubing spool.

To seal the contents of the well from the primary seal between the casing and casing head, seals additional to the primary seal are used between the tubing spool and the casing. These seals are known as "secondary" seals. Seals are also used between the tubing hanger and the mating bonnet to prevent fluid flow therebetween.

Problems with existing seals have arisen for various reasons. In one secondary seal, "double-lipped" seals in a "dog bone" type shape are used. Where the end of the casing is not well bevelled or where considerable installation care is not taken, lips of the secondary seal in the tubing spool or in a bushing mounted within the tubing spool may contact the bevelled end of the casing and be damaged or jammed into the corner of the seal retaining recess and protrude into the space between the outside of the casing and the inside of the bushing. This protrusion of the lips may prevent further assembly or the lips themselves may be sheared off when the assembly is forced.

In another type of secondary seal, the seal is formed for axial pressure between the casing and the bushing only by pressurizing the outer circumferential surface with a viscous plastic fluid injection. Further, such seals cannot convey the viscous fluid through the seal to another seal situated at a radially inwardly location.

SUMMARY OF THE INVENTION

According to one aspect of the invention, there is disclosed a wellhead sealing system comprising a casing, a tubing spool around said casing, a bushing between said tubing spool and said casing, a first bushing recess, a first tubing spool recess, a first casing seal in said first bushing recess and a first bushing seal in said first tubing spool recess, said first casing seal having cylindrical inside and outside surfaces located generally at the inside and outside diameters of said seal, respectively, said cylindrical inside surface being defined by a radially inwardly extending convex central protuberance and opposed cylindrical flat surface areas extending axially outwardly from said convex central protuberance into first transition areas extending to respective end surfaces, said outside surface being defined by a circumferential centrally located groove flanked by axially outwardly extending flexible retaining flanges forming second transition areas between said cylindrical outside surface and said end surfaces.

According to another aspect of the invention, there is disclosed a wellhead seal comprising cylindrical inside and outside surfaces located generally at the inside and outside diameters of said seal, respectively, said cylindrical inside surface being defined by a radially inwardly extending convex central protuberance and opposed cylindrical flat surface areas extending axially outwardly from said convex central protuberance into first transition areas extending to respective end surfaces, said outside surface being defined by a circumferential centrally located groove flanked by axially outwardly extending flexible retaining flanges forming second transition areas between said cylindrical outside surface and said end surfaces.

According to a further aspect of the invention, there is disclosed a wellhead seal comprising an outside surface located generally at the outside diameter of said seal, a circumferential central recess, a radially open inwardly extending circumferential entrance area to said recess, and a plurality of radially extending peripheral passageways between said outside surface of said seal and said recess.

According to a further aspect of the invention, there is disclosed a wellhead seal comprising:
an outside surface located generally at the outside diameter of said seal;
an inside surface located generally at the inside diameter of said seal;
axially outwardly located end surfaces, said end surfaces being defined by a first bevelled portion extending radially inwardly and axially outwardly from said outside surface of said seal to said axially outwardmost portion of said end surfaces;
a radially inwardly extending portion terminating adjacent the inside diameter of said tubing spool;
flexible vee rings positioned axially inwardly of said back-up rings and extending between said outside and inside diameters of said seal;
adaptor rings positioned axially inwardly of said flexible vee rings and having wedge shaped end surfaces adjacent said vee rings; and
a centrally located spacer ring positioned axially inwardly of said adaptor rings and having a series of radial peripheral passageways operable to allow injection of plastic material therethrough.

According to yet a further aspect of the invention, there is disclosed a wellhead sealing system comprising a casing, a tubing spool around said casing, a tubing spool recess and a casing seal in said tubing spool recess, said casing seal comprising cylindrical inside and outside surfaces located generally at the inside and outside diameters of said seal, respectively, said cylindrical inside surface being defined by a radially inwardly extending convex central protuberance and opposed cylindrical flat surface areas extending axially outwardly from said convex central protuberance into first transition areas extending to respective end surfaces, said outside surface being defined by a circumferential centrally located groove flanked by axially outwardly extending flexible retaining flanges forming second transition areas between said cylindrical outside surface and said end surfaces.

According to yet a further aspect of the invention, there is disclosed a wellhead sealing system comprising tubing, a tubing hanger connected to said tubing, a tubing spool supporting said tubing hanger, a mating bonnet mounted to said tubing spool, a mating bonnet recess, and a tubing hanger seal, said tubing hanger seal having an outside surface located generally at the outside diameter of said seal, a circumferential central recess, a radially open inwardly extending circumferential entrance area to said recess, and a plurality of radially extending peripheral passageways between said outside surface of said seal and said recess.

BRIEF DESCRIPTION OF THE SEVERAL VIEWS OF THE DRAWINGS

The invention will now be described, by way of example only, with reference to the accompanying drawings in which.

DESCRIPTION OF SPECIFIC EMBODIMENT

In the following description, it will be understood that the terms "radial", "axial", "inwardly", and "outwardly" are used with reference to the directions as viewed in FIG. 1.

Figure 1:
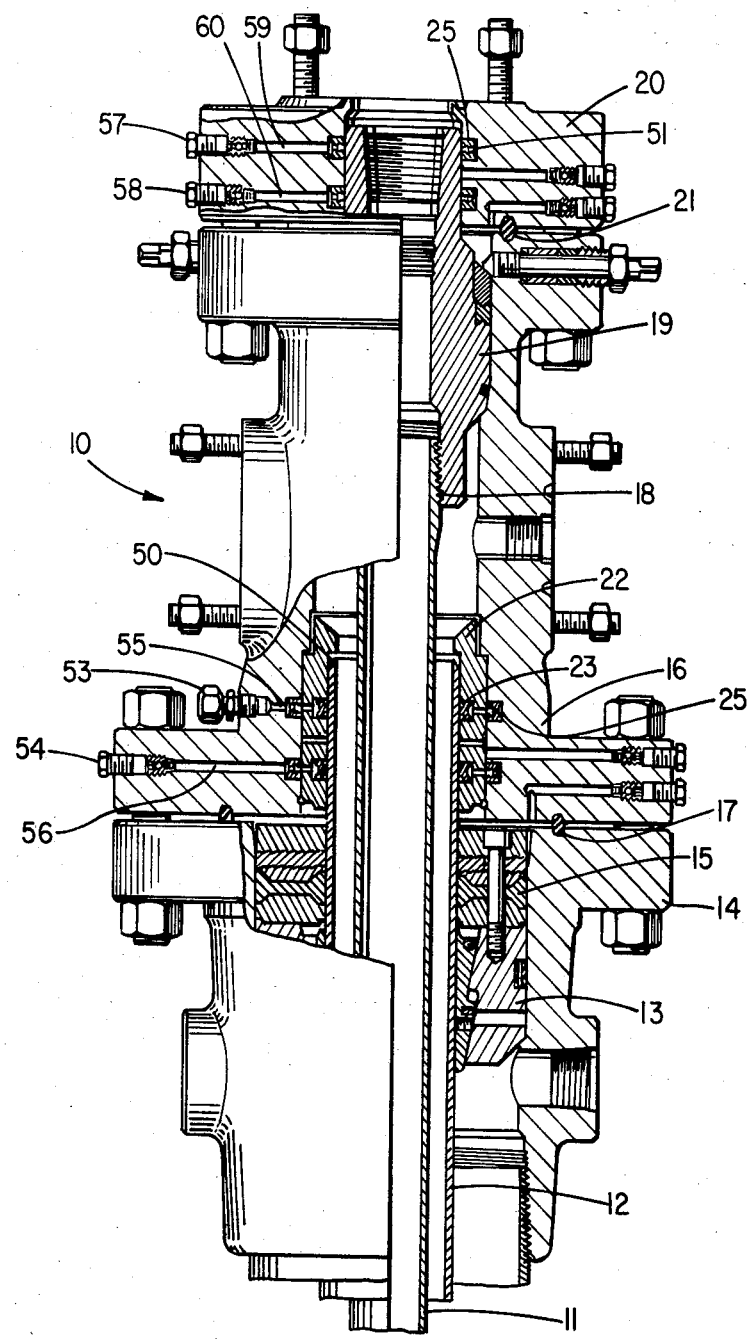
FIG. 1 is a diagrammatic partially cutaway cross-sectional view of a wellhead assembly.

Referring to the drawings, a wellhead is shown generally at 10 in FIG. 1. Tubing 11 and casing 12 extend upwardly from the drill hole into the wellhead 10. A large portion of the load of the casing 12 is borne by a casing hanger generally denoted 13. Casing hanger 13 is mounted in casing head 14 and a primary seal 15 seals between the casing 12 and the casing head 14.

A tubing spool 16 is mounted to the top of casing head 14. A ring gasket 17 acts between the flanges of the tubing spool 16 and casing head 14.

The tubing 11 has a threaded end portion 18 and a tubing hanger 19 is connected thereto and mounted in the upper end of tubing spool 16. A mating bonnet 20 is connected to the tubing spool 16. A ring gasket 21 acts between the tubing hanger 19 and the mating bonnet 20.

Figure 2:
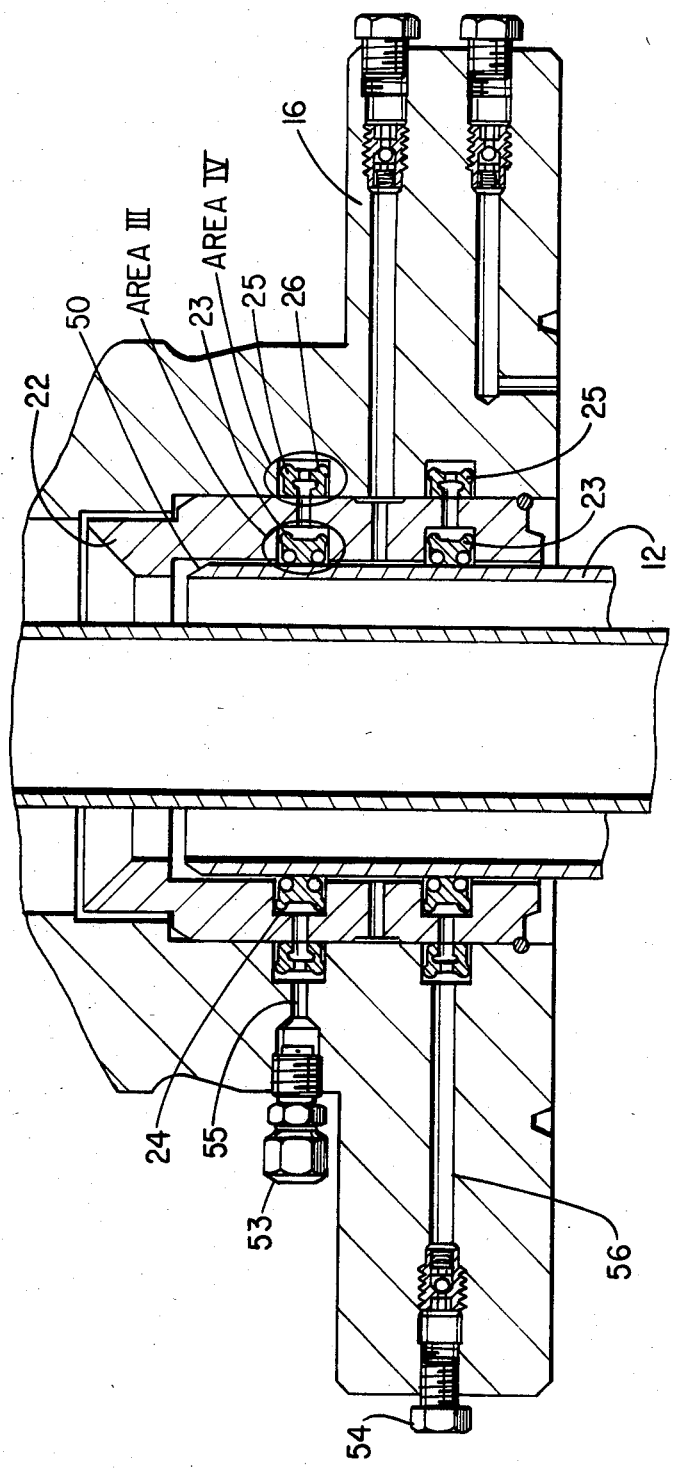
FIG. 2 is a partial enlarged cross-sectional view of the hardware surrounding the top of the casing as shown in FIG. 1.

As more clearly shown in FIG. 2, a bushing 22 is utilized when the outside diameter of casing 12 is relatively smaller than the inside diameter of tubing spool 16. The bushing 22 is mounted within tubing spool 16 and is positioned between the casing 12 and the tubing spool 16. A first casing seal is shown generally at 23 and is retained in a bushing recess 24 in bushing 22 and acts between the bushing 22 and casing 12. A first bushing seal is shown generally at 25 and is retained in a tubing spool recess 26 in tubing spool 16 and acts between the bushing 22 and the tubing spool 16. Both the first casing and bushing seals 23, 25, respectively, are duplicated at a lower position in the bushing 22 and tubing spool 16.

Figure 3:
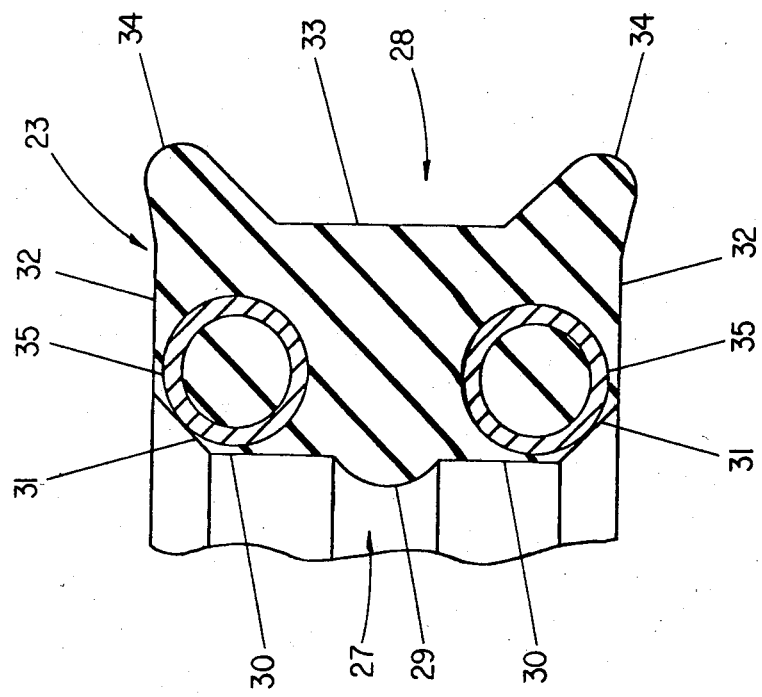
FIG. 3 is an enlarged cross-sectional view of the Area III in FIG. 2.

The first casing seal 23 is shown in more detail in FIG. 3. It is known colloquially as a "garter spring" or "GS" type seal and is made from flexible elastomer material. First casing seal 23 comprises cylindrical inside and outside surfaces shown generally at 27, 28, respectively, which surfaces are located generally at the inside and outside diameters of the first casing seal 23. The cylindrical inside surface 27 is defined by a convex central protuberance 29 which extends radially inwardly from cylindrical inside surface 27. Cylindrical flat surface areas 30 each extend axially outwardly from convex central protuberance 29 into first transition areas 31 which extend to respective end surfaces 32. The cylindrical outside surface 28 is defined by a circumferential centrally located groove 33 flanked by axially outwardly extending flexible retaining flanges 34 which form second transition areas between the circumferential centrally located groove 33 and the end surfaces 32.

A pair of spring means, namely coiled or "garter" springs 35 extend around the inside circumference of first casing seal 23, one adjacent each of first transition areas 31. The coiled springs 35 protect first transition areas 31 and lend rigidity to the casing seal 23.

Figure 4:
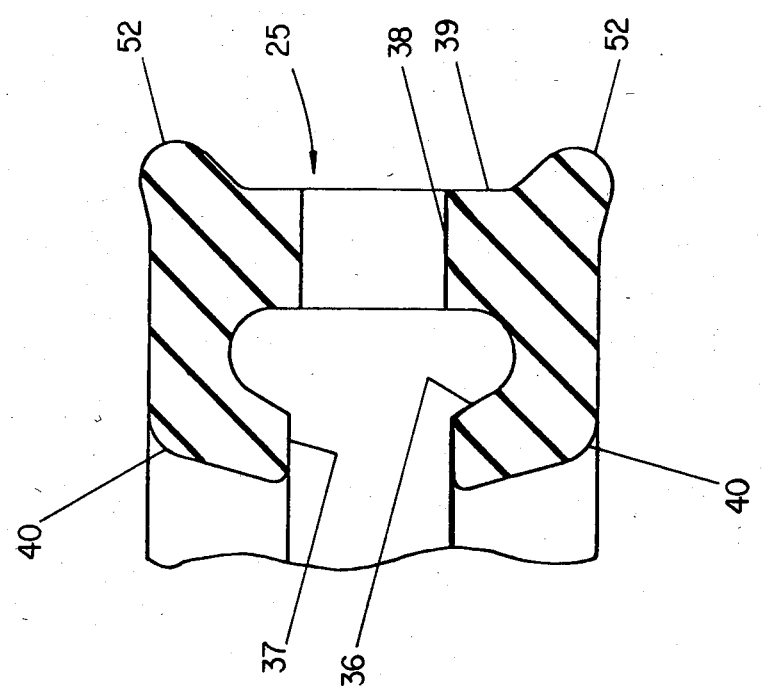
FIG. 4 is an enlarged cross-sectional view of the Area IV in FIG. 2.

The first bushing seal 25 is shown in more detail in FIG. 4. It is known colloquially as a "B" type seal and is also made from flexible elastomer material. The shape of bushing seal 25 is generally similar to that of casing seal 13 and both are interchangeable in the same recess. However, whereas casing seal 23 has a convex central protuberance 29 on the cylindrical inside surface 27, the central portion of bushing seal 25 is a circumferential central recess or cavity 36 with a radially open inwardly extending circumferential entrance area 37. A further difference between casing seal 23 and bushing seal 25 is that the latter has a plurality of radially extending peripheral passageways 38 between the outside surface 39 and the cavity 36 which allow for radial injection of plastic material when it is needed. Flexible retaining lips 40 extend axially outwardly from and flank cavity 36.

Figure 5:
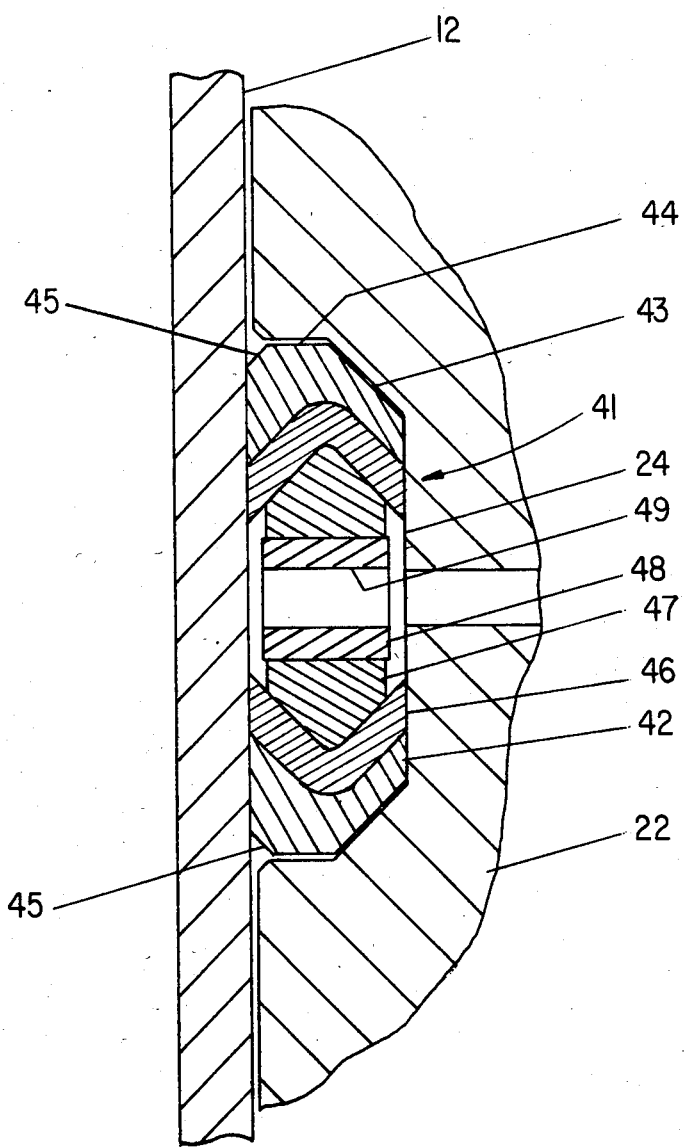
FIG. 5 is an enlarged cross-sectional view of an alternative embodiment of the invention depicted in assembled form.

An alternate embodiment of a casing seal is depicted in FIG. 5. This casing seal shown generally at 41 is colloquially known as a plastic loaded vee or "PLV" type seal. It acts as a replacement for first casing seal 23 under severe and extreme pressure operating conditions and is mounted at the same position within a bushing recess 24 in bushing 22, which recess, however, is modified as depicted in FIG. 5.

PLV type seal 41 comprises seven components. The axially outwardmost located components are the back-up rings 42. Back-up rings 42 have their axially outwardly located end surfaces machined in the same general configuration as bushing recess 24. A first bevelled portion 43 extends radially inwardly and axially outwardly from the outside surface of casing seal 41 to the axially outwardmost portion of the end surfaces. Thence, the end surface has a radially inwardly extending portion 44 which terminates adjacent the inside diameter of the bushing 22. A second bevelled portion 45 extends radially and axially inwardly and terminates adjacent the outside diameter of casing 12.

Flexible vee rings 46 are positioned axially inwardly of back-up rings 42 and extend between the radial outside diameters of the bushing recess 24 and casing 12.

Adaptor rings 47 are located axially inwardly of flexible vee rings 46 and have wedge shaped end surfaces adjacent the flexible vee rings 46. A spacer ring 48 is centrally located and positioned axially inwardly of the adaptor rings 47. It includes a series of radial peripheral passageways 49 to allow injection of plastic material.

Spacer ring 48 also has a radial cut therein (not shown) to allow installation of the spacer ring 48 in the bushing recess 24.

OPERATION

In operation, it will first be assumed that the outer diameter of the casing 12 is relatively smaller than the inside diameter of the tubing spool 16. In this case, bushing 22 is required between casing 12 and tubing spool 16. It will further be assumed that the first casing seal 23 is a GS type seal as shown in FIG. 3 and that the bushing seal is a B type seal 25 as shown in FIG. 4.

Both the casing or GS type seal 23 and the bushing or B type seal 25 are continuous and are, therefore, snap fitted into their respective recesses 24, 26 in the bushing 22 and tubing spool 16, respectively. After the casing 12 is cut to the appropriate length above casing head 14, the tubing spool 16 together with bushing 22, casing or GS type seal 23 and bushing or B type seal 25 will be installed over the casing 12 and connected to the flange of casing head 14. If the bevelled portion 50 (FIG. 2) of casing 12 strikes one of the first transition areas 31 of casing seal 23 during installation, the casing seal 23 will be guided over the casing by the transition areas 31 and is not likely to be damaged or forced outside the bushing recess 24 because of the configuration of the first transition areas 31 and the increased strength provided by the garter springs 35. As the seal 23 moves downwardly over casing 12, the convex central protuberance 29 provides initial contact pressure against casing 12 and sets the initial seal between the casing 12 and the bushing 22. In addition, because of a certain degree of allowable radial movement between the casing seal 23 and the inside diameter of recess 24 (FIG. 2), casing seal 23 will maintain the initial seal with casing 12 despite relative movement of the casing 12 as installation proceeds A bushing or B type seal 25 is used between the tubing spool 16 and bushing 22. This is so because both the bushing 22 and tubing spool 16 are manufactured with closer tolerance and surface finish control than is possible with the fit between casing 12 and bushing 22 and, accordingly, the possibility of bushing seal 25 extruding from tubing spool recess 26 or being damaged during installation is minimal.

After the installation of tubing spool 16, tubing hanger 19 is threaded on complementary threaded end portion 18 of tubing 11 and is mounted within tubing spool 16. Ring gasket 21 is positioned on the upper end of tubing spool 16 and mating bonnet 20 is mounted thereon. Mating bonnet 20 has two bushing or B type seals 25 installed in suitable bonnet recesses 51, again because of the tolerance and machining control possible between tubing hanger 19 and mating bonnet 20.

When axial well pressure is applied by fluid or gas between the casing 12 and bushing 22 to casing seal 23, the convex central protuberance 29 will prevent the gas or fluid from passing and it will flow around the seal 23 displacing upstream flexible retaining flange 34 and permitting the fluid to flow into groove 33. This forces surface area 30 against the casing 12 and downstream flexible retaining flange 34 and end surface 32 against the end wall of bushing recess 24 thus completing the sealing effect.

When axial well pressure is applied to the bushing seal 25, the fluid or gas will initially flow into cavity 36 (FIG. 4) and through peripheral passageways 38 which will force flexible retaining lips 40 to constrict inwardly against casing 12 and the flexible retaining flanges 52 to move axially against the end walls of tubing spool recess 26 thus completing the sealing effect.

Plastic may be injected to further enchance sealing in the event the surface of the casing 12 is damaged or deeply scratched. The plastic is injected through connections 53, 54 in tubing spool 16 (FIG. 2). The injected plastic passes from the connections 53, 54 and associated passageways 55, 56, into each tubing spool recess 26, and through the peripheral passageways 38 in bushing seal 25. Thence, the plastic flows into the radial periphery in each bushing recess 24 outside each casing seal 23. The pressure from the injected plastic material provides a strong radial force on casing seal 23 and also acts against the flexible retaining flanges 34. The plastic will similarly act within the cavity 36 and around the outside surface 39 of bushing seal 25, forcing the flexible retaining lips 40 to constrict inwardly against casing 12 and forcing flexible retaining flanges 52 against the end walls of the tubing spool recess 26 thus enhancing the sealing effect.

For severe service or extreme well pressure conditions or where the surface conditions of the well casing 12 are exceptionally poor, casing or GS seal 23 may be replaced with casing or PLV type seal 41 (FIG. 5). In this case, bushing recess 24 will be adapted to closely conform to the shape of PLV seal 41 as described hereafter. The back-up rings 42, the flexible vee rings 46 and the adaptor rings 47 are all continuous and are inserted into operating position in bushing recess 24. Spacer ring 48, however, has a radial cut which allows it to be inserted after installation of the back-up rings 42, vee rings 46 and adaptor rings 47.

Plastic injection is also used with PLV type seal 41. The plastic material will be injected into connections 53, 54 and flow as earlier described into the bushing recess 24. The plastic material will act axially outwardly on the flexible vee rings 46 which, in turn, will act axially outwardly on back-up rings 42. Each first bevelled portion 43 of back-up rings 42 will act against its complementary bevelled portion on bushing recess 24 which creates a wedging effect forcing the back-up rings 42 and, therefore, fitted vee rings 46 against the surface of casing 12. This creates an enhanced sealing force. Back-up rings 42 are moved inwardly towards casing 12 and are, therefore, in close contact therewith. This contact will bridge any radial clearance between casing 12 and PLV type seal 41 through which portions of the flexible vee rings 46 could otherwise be extruded by high pressure.

When the outside diameter of the casing 12 closely matches the inside diameter of the tubing spool 16, a bushing will not be required and each tubing spool recess 26 will carry a respective casing seal 23 which will act directly between the tubing spool 16 and casing 12.

A bushing or type B seal 25 may be mounted in each of the bonnet recesses 51 in mating bonnet 20 (FIG. 1). This is appropriate since the seal 25 is bridging the gap existing between the tolerance controlled surfaces of mating bonnet 20 and tubing hanger 19. If it is desired to use plastic injection to enhance the sealing, the plastic is injected through connections 57, 58 and respective passageways 59, 60. The plastic passes into bushing or B type seal 25 and, as earlier described, the flexible retaining lips 40 and flanges 52 are pressed against the outer diameter of tubing hanger 19 and against the end walls of the bonnet recess 51 in mating bonnet 20 thus creating an enhanced sealing effect.

While several embodiments of the invention have been described, it is not intended to limit the scope of the invention thereby. Various modifications may be made in these embodiments which modifications will still fall within the scope of the invention as defined in the accompanying claims.

I claim:

1. A wellhead sealing system comprising a casing, a tubing spool around said casing, a bushing between said tubing spool and said casing, a first bushing recess, a first tubing spool recess, a first casing seal in said first bushing recess and a first bushing seal in said first tubing spool recess, said first casing seal having cylindrical inside and outside surfaces located generally at the inside and outside diameters of said seal, respectively, said cylindrical inside surface being defined by a radially inwardly extending convex central protuberance and opposed cylindrical flat surface areas extending axially outwardly from said convex central protuberance into first transition areas extending to respective end surfaces, said outside surface being defined by a circumferential centrally located groove flanked by axially outwardly extending flexible retaining flanges forming second transition areas between said cylindrical outside surface and said end surfaces.

2. A wellhead sealing system as in claim 1 wherein said first casing seal further includes spring means extending around the inside circumference of said seal adjacent each of said first transition areas.

3. A wellhead sealing system as in claim 2 wherein said first bushing seal comprises an outside surface located generally at the outside diameter of said bushing seal, a circumferential central recess, a radially open inwardly extending circumferential entrance area to said recess, and a plurality of radially extending peripheral passageways between said outside surface of said bushing seal and said recess.

4. A wellhead sealing system as in claim 3 and further comprising a second bushing recess in said bushing, a second tubing spool recess in said tubing spool, a second casing seal in said second bushing recess and a second bushing seal in said second tubing spool recess.

5. A wellhead sealing system as in claim 4 wherein each of said second bushing and said tubing spool recesses are substantially identical to each of said first bushing and tubing spool recesses, respectively, and each of said second casing and bushing seals are substantially identical to said first casing and bushing seals, respectively.

6. A wellhead sealing system comprising a casing, a tubing spool around said casing, a bushing between said tubing spool and said casing, a first bushing recess, a first tubing spool recess, a first casing seal in said bushing recess and a first bushing seal in said tubing spool recess, said first casing seal comprising an outside surface located generally at the outside diameter of said casing seal, axially outwardmost back-up rings having axially outwardly located end surfaces, said end surfaces being defined by a first bevelled portion extending radially inwardly and axially outwardly from said outside surface of said casing seal to said axially outwardmost portion of said end surfaces, a radially inwardly extending portion terminating adjacent the inside diameter of said tubing spool and a second bevelled portion extending radially and axially inwardly and terminating adjacent the outside diameter of said bushing; flexible vee rings positioned axially inwardly of said back-up rings and extending between the outside diameters of said bushing recess and said bushing; adaptor rings positioned axially inwardly of said flexible vee rings and having wedge shaped end surfaces adjacent said vee rings; and a centrally located spacer ring positioned axially inwardly of said adaptor rings and having a series of radial peripheral passageways operable to allow injection of plastic material therethrough.

7. A wellhead seal comprising cylindrical inside and outside surfaces located generally at the inside and outside diameters of said seal, respectively, said cylindrical inside surface being defined by a radially inwardly extending convex central protuberance and opposed cylindrical flat surface areas extending axially outwardly from said convex central protuberance into first transition areas extending to respective end surfaces, said outside surface being defined by a circumferential centrally located groove flanked by axially outwardly extending flexible retaining flanges forming second transition areas between said cylindrical outside surface and said end surfaces.

8. A wellhead seal as in claim 7 and further comprising spring means extending around the inside circumference of said seal adjacent each of said first transition areas.

9. A wellhead seal comprising cylindrical inside and outside surfaces located generally at the inside and outside diameters of said seal, respectively, said cylindrical inside surface being defined by a radially inwardly extending convex central protuberance and opposed cylindrical flat surface areas extending axially outwardly from said convex central protuberance into first transition areas extending to respective end surfaces, said outside surface being defined by a circumferential centrally located groove flanked by axially outwardly extending flexible retaining flanges forming second transition areas between said cylindrical outside surface and said end surfaces and spring means extending around the inside circumference of said seal adjacent each of said first transition areas.

10. A wellhead seal as in claim 9 wherein said spring means are garter springs.

11. A wellhead seal comprising an outside surface located generally at the outside diameter of said seal, a circumferential central recess, a radially open inwardly extending circumferential entrance area to said recess, and a plurality of radially extending peripheral passageways between said outside surface of said seal and said recess.

12. A wellhead seal as in claim 11 wherein said outside surface is defined by a circumferential centrally located groove flanked by axially outwardly extending flexible retaining flanges forming second transition areas between said cylindrical outside surface and the end surfaces of said seal.

13. A wellhead seal comprising an outside surface located generally at the outside diameter of said seal, a circumferential central recess, a radially open inwardly extending circumferential entrance area to said recess, and a plurality of radially extending peripheral passageways between said outside surface of said seal and said recess, said outside surface being defined by a circumferential centrally located groove flanked by axially outwardly extending flexible retaining flanges forming second transition areas between said cylindrical outside surface and the end surfaces of said seal.

14. A wellhead seal comprising:
an outside surface located generally at the outside diameter of said seal;
an inside surface located generally at the inside diameter of said seal;
axially outwardly located end surfaces, said end surfaces being defined by a first bevelled portion extending radially inwardly and axially outwardly from said outside surface of said seal to said axially outwardmost portion of said end surfaces;
a radially inwardly extending portion terminating adjacent the inside diameter of said tubing spool;
flexible vee rings positioned axially inwardly of said back-up rings and extending between said outside and inside diameters of said seal;
adaptor rings positioned axially inwardly of said flexible vee rings and having wedge shaped end surfaces adjacent said vee rings; and
a centrally located spacer ring positioned axially inwardly of said adaptor rings and having a series of radial peripheral passageways operable to allow injection of plastic material therethrough.

15. A wellhead seal as in claim 14 and further comprising a second bevelled portion extending radially and axially inwardly from said termination of said first bevelled portion to adjacent the inside diameter of said seal.

16. A wellhead seal comprising:
an outside surface located generally at the outside diameter of said seal;
an inside surface located generally at the inside diameter of said seal;
axially outwardly located end surfaces, said end surfaces being defined by a first bevelled portion extending radially inwardly and axially outwardly from said outside surface of said seal to said axially outwardmost portion of said end surfaces;
a radially inwardly extending portion terminating adjacent the inside diameter of said tubing spool and a second bevelled portion extending radially and axially inwardly from said termination of said first bevelled portion to adjacent the inside diameter of said seal;
flexible vee rings positioned axially inwardly of said back-up rings and extending between said outside and inside diameters of said seal;
adaptor rings positioned axially inwardly of said flexible vee rings and having wedge shaped end surfaces adjacent said vee rings; and
a centrally located spacer ring positioned axially inwardly of said adaptor rings and having a series of radial peripheral passageways operable to allow injection of plastic material therethrough.

17. A wellhead sealing system comprising a casing, a tubing spool around said casing, a tubing spool recess and a casing seal in said tubing spool recess, said casing seal comprising cylindrical inside and outside surfaces located generally at the inside and outside diameters of said seal, respectively, said cylindrical inside surface being defined by a radially inwardly extending convex central protuberance and opposed cylindrical flat surface areas extending axially outwardly from said convex central protuberance into first transition areas extending to respective end surfaces, said outside surface being defined by a circumferential centrally located groove flanked by axially outwardly extending flexible retaining flanges forming second transition areas between said cylindrical outside surface and said end surfaces.

18. A wellhead sealing system as in claim 17 wherein said casing seal further includes spring means extending around the inside circumference of said seal adjacent each of said first transition areas.

19. A wellhead sealing system comprising a casing, a tubing spool around said casing, a tubing spool recess and a casing seal in said tubing spool recess, said casing seal comprising cylindrical inside and outside surfaces located generally at the inside and outside diameters of said seal, respectively, said cylindrical inside surface being defined by a radially inwardly extending convex central protuberance and opposed cylindrical flat surface areas extending axially outwardly from said convex central protuberance into first transition areas extending to respective end surfaces, said outside surface being defined by a circumferential centrally located groove flanked by axially outwardly extending flexible retaining flanges forming second transition areas between said cylindrical outside surface and said end surfaces, and spring means extending around the inside circumference of said seal adjacent each of said first transition areas.

20. A wellhead sealing system comprising tubing, a tubing hanger connected to said tubing, a tubing spool supporting said tubing hanger, a mating bonnet mounted to said tubing spool, a mating bonnet recess, and a tubing hanger seal, said tubing hanger seal having an outside surface located generally at the outside diameter of said seal, a circumferential central recess, a radially open inwardly extending circumferential entrance area to said recess, and a plurality of radially extending peripheral passageways between said outside surface of said seal and said recess.

21. A wellhead sealing system as in claim 20 wherein said outside surface of said tubing hanger seal is defined by a circumferential centrally located groove flanked by axially outwardly extending flexible retaining flanges forming second transition areas between said cylindrical outside surface and the end surfaces of said seal.

22. A wellhead sealing system comprising tubing, a tubing hanger connected to said tubing, a tubing spool supporting said tubing hanger, a mating bonnet mounted to said tubing spool, a mating bonnet recess, and a tubing hanger seal, said tubing hanger seal having an outside surface located generally at the outside diameter of said seal, a circumferential central recess, a radially open inwardly extending circumferential entrance area to said recess, and a plurality of radially extending peripheral passageways between said outside surface of said seal and said recess, said outside surface being defined by a circumferential centrally located groove flanked by axially outwardly extending flexible retaining flanges forming second transition areas between said cylindrical outside surface and the end surfaces of said seal.

* * * * *